(12) United States Patent
Klimchynski (10) Patent No.: US 7,120,908 B1
(45) Date of Patent: Oct. 10, 2006

(54) METHOD AND SYSTEM FOR IMPROVING MEMORY ALLOCATION IN EMBEDDED SOFTWARE DESIGN APPLICATIONS

(75) Inventor: Igor Klimchynski, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 510 days.

(21) Appl. No.: 10/308,171

(22) Filed: Dec. 3, 2002

Related U.S. Application Data (60) Provisional application No. 60/334,923, filed on Dec. 4, 2001.

(51) Int. Cl.
*G06H 9/44* (2006.01)

(52) U.S. Cl. .................. 717/165; 717/116; 717/164
(58) Field of Classification Search ........ 717/106–109, 717/114–119, 162–166
See application file for complete search history.

(56) References Cited

OTHER PUBLICATIONS

Freescale Semiconductor (hereinafter: Freescale), "MCUez Linker User's Manual", Freescale Semiconductor, Inc., pp. i-ix, 1-116, index: 1-4, Feb. 1998.*
Eckel, "Thinking in C++", Mind View Inc., 2nd Edition, vol. 1, Chapter 3, pp. 1-77, 2000.*

* cited by examiner

*Primary Examiner*—Ted T. Vo
(74) *Attorney, Agent, or Firm*—Irah H. Donner; Wilmer Cutler Pickering Hale and Dorr LLP (57) ABSTRACT

A system implementing an embedded software application having at least one data type includes a first memory that stores a constant part of the at least one data type (class), a second memory that stores a variable part of the at least one data type (class), and a linking object that actively links the first memory and the second memory such that the constant part and the variable part are aggregated into the at least one data type (class). A method for implementing an embedded software application includes storing the constant part in a first memory, storing the variable part in a second memory, defining a linking object between the constant part and the variable part, and implementing the embedded software application by implementing the constant part, which is stored in the first memory, and implementing the at least one variable part, which stored in the second memory, by implementing the linking object.

50 Claims, 7 Drawing Sheets

METHOD AND SYSTEM FOR IMPROVING MEMORY ALLOCATION IN EMBEDDED SOFTWARE DESIGN APPLICATIONS

CROSS REFERENCE TO RELATED APPLICATIONS

This application is related to and claims the priority from U.S. Provisional Application Ser. No. 60/334,923, filed Dec. 4, 2001 and incorporated herein by reference.

FIELD OF THE INVENTION

The present invention relates generally to the field of embedded and/or object-oriented software application designs, and in particular, the present invention relates to improving the reliability of embedded software applications by improving the ROM/RAM ratio and/or reducing memory requirements for RAM of memory allocation for an embedded and/or object-oriented software application, as well as decrease start up time by eliminating or reducing a need for transfer data from ROM to RAM.

BACKGROUND OF THE RELATED ART

Many of today's software driven systems are implemented using embedded systems. And embedded system is any electronic system that uses a standard central processor unit ("CPU") chip, a microprocessor, and the like, but that is not as bulky as a general-purpose workstation, desktop or laptop computer. Such systems generally use microprocessors, or they may use custom-designed chips or both. Embedded systems are used in automobiles, planes, trains, space vehicles, machine tools, cameras, consumer and office appliances, cell phones, personal digital assistants ("PDAs") and other handhelds as well as robots and toys.

One method of implementing general software applications, for example, embedded systems, utilizes object-oriented design ("OOD") and Unified Model Language ("UML"). Object-oriented design is concerned with developing an object-oriented model of a software system to implement identified requirements. OOD refines candidate objects into classes, defines message protocols for all objects, defines data structures and procedures, and maps these into an object-oriented programming language. Design is typically done in two phases. The first, called high-level design, deals with the decomposition of the system into large, complex objects. The second phase is called low-level design. In this phase, attributes and methods are specified at the level of individual objects. UML is an object-oriented analysis and design language that can be used to implement OOD.

Embedded systems, which are typically implemented using microprocessor chips, as described previously, with a limited size of random-access memory ("RAM"). Manufacturing a chip with generous RAM size greatly increases the cost of the chip. Straightforward implementation of OOD, for example, in C or C++ programming language for embedded systems requires more RAM than is economically feasible for most chips.

Several prior art systems have tackled the problem of the lack of microprocessor RAM needed for embedded systems. In U.S. Pat. No. 6,343,353 B1 (Kim), incorporated herein by reference, a system is described to provide a micro-controller unit for accessing an external memory using a microcode, thereby scaling down the chip size and improving a stability of the circuit. The micro-controller unit for accessing an external memory according to the characteristics of the external memory, comprises: a ROM storing a series of codes including sequence, address latch enable, read enable and write enable fields, wherein the ROM outputs one of codes in response to a counting value and a program counting determining means for determining the counting value in response to the sequence filed of the outputted code from the ROM and for outputting the counting value to the ROM.

U.S. Pat. No. 6,317,872 B1 (Gee et al.), incorporated herein by reference, teaches an improved symbolic to logical reference resolution method that performs the function of converting symbolic references into logical addresses without changing instructions or reference information in the instruction sequence. Instead, the resolution information for an object is included within the object itself, so any other procedures that might access the object gain the speed advantage of the symbolic to logical resolution that has been performed on the object by the first procedure to reference that object. No modification of the sequence of program instructions is needed, so the program sequence can be stored in lower cost read-only memory (ROM) if desired. Also, since the program sequence is unchanged, checksum methods can be used to insure the integrity of the read-only memory contents for enhanced system reliability that, in turn, may significantly reduce costs associated with the certification of critical systems.

U.S. Pat. No. 6,154,834 (Neal), incorporated herein by reference, teaches a processing unit featuring a substrate with an embedded controller and a memory unit attached to the substrate. The memory unit is loaded with microcode. The embedded controller is interconnected to the memory unit via a communication line. This communication line enables microcode to be transferred from the memory unit to the embedded controller.

U.S. Pat. No. 5,504,903 (Chen et al.), incorporated herein by reference, teaches a simplified programming setup that employs an auto-incrementing pointer and an on-chip read-only memory (ROM) to store the program. The processor of the microcontroller programs its own program memory using the instruction. A pointer to the program memory is used by the instruction to program the program memory, the pointer being capable of auto-incrementing for ease of stepping through the program memory. The processor has an on-chip hard coded ROM with a program containing the program memory programming instructions and other code to permit a relatively simple auto-programming setup.

None of the prior art, however, addresses how to implement OOD for an embedded system such that the ROM-to-RAM ratio for the embedded system is improved. I have determined that improving the ROM-to-RAM ratio would, for example, allow for a more complex OOD implementation of embedded systems without requiring more expensive microprocessors with greater RAM size. What is desirable is, for example, a system and/or method for improving the ROM-to-RAM ratio, and/or the reliability of embedded software applications. It is also desirable to provide a system and/or method that are capable, generally, of allocating programming operations across multiple memories, including RAM and ROM.

SUMMARY OF THE INVENTION

It is one feature and advantage of the present invention to lower the cost of object-oriented design implementations of embedded systems by improving the ratio of the amount of read-only memory utilized by the embedded system as compared to the amount of random-access memory utilized by the embedded system.

It is another optional feature and advantage of the present invention to improve the reliability of embedded software applications and lowering the probability of interference with and alteration to an embedded software application due to external effects.

It is another optional feature and advantage of the present invention to lower storage usage of RAM.

It is another optional feature and advantage of the present invention decrease start up time of embedded software applications by eliminating or reducing a need for transfer data from ROM to RAM.

These and other features and advantages of the present invention are achieved in a system that implements an embedded software application. The embedded software application has at least one data type implemented by the system. The data type includes a constant part and a variable part. The system includes a first memory that stores the constant part of the at least one data type. The system also includes a second memory that stores the variable part of the at least one data type. The system further includes a linking object that actively links the first memory and the second memory such that the constant part and the variable part are aggregated into the at least one data type.

In another embodiment of the present invention, a system is provided that implements an embedded software application that realizes an object-oriented design. The embedded software application has at least one data type (class) that includes at least one constant attribute and at least one variable attribute. The at least one data type is instantiated as at least one object that comprises the at least one constant attribute. The system includes a first memory that stores the at least one constant attribute. The at least one constant attribute is implemented as a class instance. The system also includes a second memory that stores the at least one variable attribute. The at least one variable attribute is implemented as a class instance. The system further includes a pointer, implemented as a class member of the at least one constant attribute. The pointer points from the first memory to the second memory such that the at least one object is capable of referencing the associate at least one variable attribute.

In another alternative embodiment of the present invention, at system is provided that implements an embedded software application that is implemented by an object-oriented design. The embedded software application has a plurality of data types that includes a first number of constant objects and a second number of variable objects. The object-oriented design is implemented by the system. The system includes a first memory that stores the first number of constant objects and a second memory that stores the second number of variable objects. The system also includes a resource class that comprises an array. The array includes the first number of constant objects and the second number of variable objects. The resource class provides method to access and control the constant objects and the variable objects.

In another alternative embodiment of the present invention, a system is provided that implements an embedded software application that realizes an object-oriented design. The embedded software application implements an event subscription mechanism for a server object and a client object. The client object has an associated function. The system includes a first memory that stores the server object. The server object is implemented as a class instance. The system also includes a second memory that stores at least one variable attribute of the server object. The system further includes a first pointer, implemented as a class attribute of the server object, that points from the server object to the client object. The system also includes a second pointer, implemented as a class attribute of the server object, that points from the server object to the function of the client object.

In another alternative embodiment of the present invention, a system is provided that implements an embedded software application. The embedded software application has at least one data type implemented by the system. The at least one data type includes a constant part and a variable part. The system includes a microprocessor and a first memory that stores the constant part of the at least one data type. The system also includes a second memory that stores the variable part of the at least one data type. The system further includes a linking object. The linking object aggregation of the constant part, which is stored in the first memory, and the at least one variable part, which is stored in the second memory, into the at least one data type. The aggregation provides the system access and/or control of the at least one data type.

In another embodiment of the present invention, a method is provided for implementing an embedded software application. The embedded software application as at least one data type that includes a constant part and a variable part. The method includes storing the constant part in a first memory. The method also includes storing the variable part in a second memory. The method further includes defining a linking object between the constant part and the variable part. The method also includes implementing the embedded software application by implementing the constant part, which is stored in the first memory, and implementing the at least one variable part, which stored in the second memory, by implementing the linking object.

There has thus been outlined, rather broadly, the more important features of the invention and several, but not all, embodiments in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DESCRIPTION OF THE PREFERRED EMBODIMENTS

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

There are several common object-oriented design ("OOD") patterns applicable to a wide range of embedded software that is executed in place from a read-only memory ("ROM") of a microprocessor. Implementations of design patterns are not limited, however, implementation of embedded software is preferably done using an object-oriented programming language, for example, C++.

Figure 1:
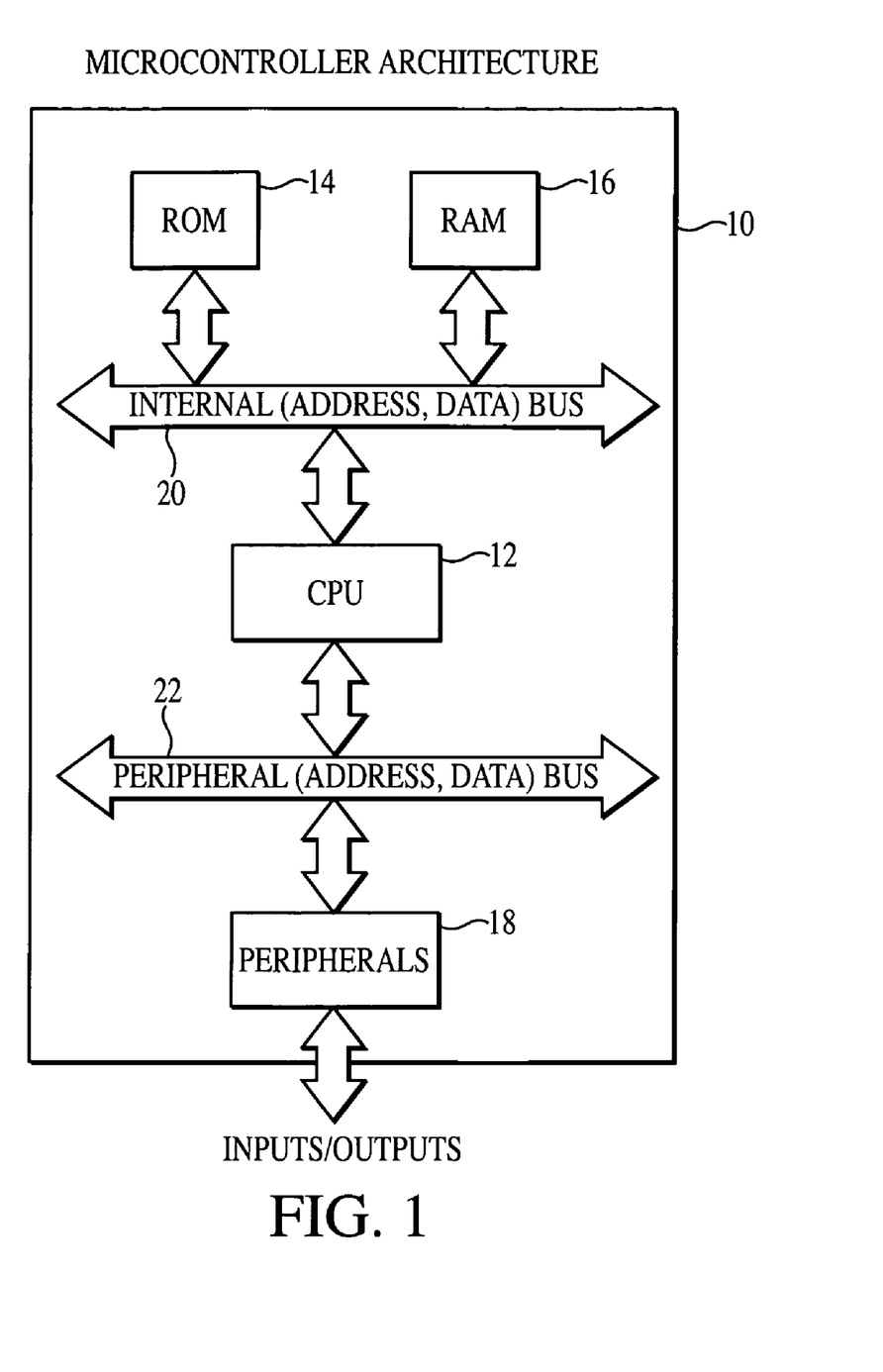
FIG. 1 is a block diagram of a microprocessor or microcontroller used to implement an embedded system according to the present invention.

FIG. 1 illustrates a block diagram of a microprocessor or microcontroller used to implement an embedded system according to the present invention. Microprocessor 10 includes: central processing unit ("CPU") 12, read-only memory ("ROM") 14, random-access memory ("RAM") 16, and peripherals 18. Microprocessor 10 may include any number or configuration of ROMs 14, RAMs 16, and peripherals 18, as is determined by the particular embedded system being implemented. Peripherals 18 may include, for example, input/output devices, i.e., analog/digital inputs/outputs, serial communication ports, hardware timers, a keyboard controller, a mouse controller, a printer controller, a display controller, etc. CPU 12 communicates with ROM 14 and RAM 16 through internal bus 20. CPU 12 communicates with peripherals 18 through peripheral bus 22.

Figure 2:
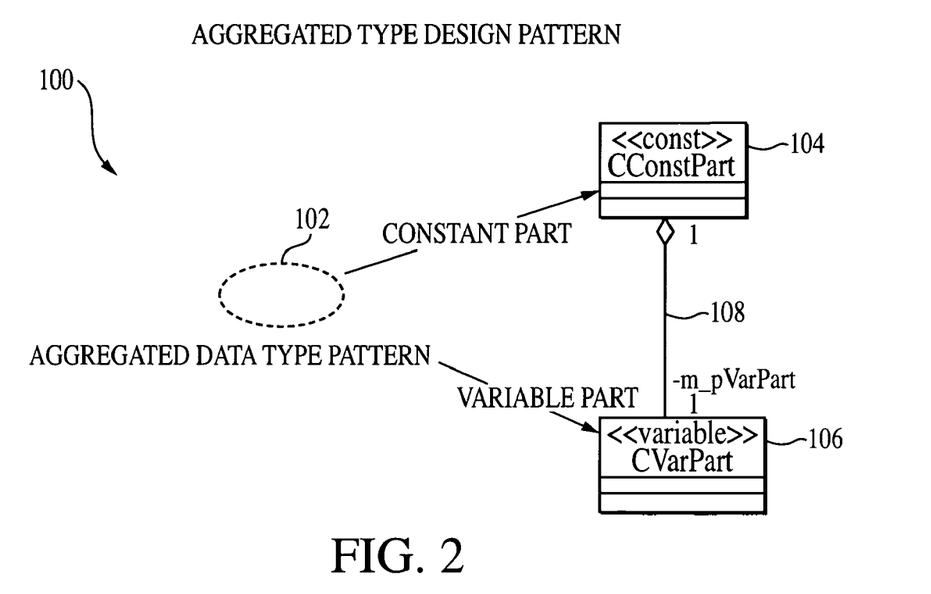
FIG. 2 is a Unified Modeling Language class diagram of an aggregated data type design pattern for implementing an embedded system according to the present invention.

FIG. 2 illustrates a Unified Modeling Language ("UML") class diagram 100 of aggregated data type design pattern 102. Aggregated data type design pattern 102 typically consists of two heterogeneous data parts, for example: constant part 104 and variable part 106, which represents, for example, the variable attributes of constant part 104. Constant part 104 and variable part 106 may be implemented as classes, as illustrated in FIG. 2. In this example, constant part 104 is called "CConstPart" and variable part 106 is called "CVarPart." A typical example of an aggregated data type in an embedded application would be a software timer with a constant part to maintain, for example, initialization values or other constants and a variable part to count time intervals.

In order to make a minimal or reduced usage of RAM 16 for an embedded system, and thus likely reduce the cost of microprocessor 10 and/or RAM 16 used to implement the embedded system, preferably only variable part 106 is stored in RAM 16. Constant part 104 is preferably stored in ROM 14 in its entirety, or substantial entirety, as the information associated with constant part 104 does not change as the embedded system is being executed.

The association between constant part 104 and variable part 106 preferably is provided in the form of aggregation by reference using pointer 108, which points from constant part 104 to variable part 106. Pointer 108 may be defined as part of constant part 104. In this example, pointer 108 is called "m_pVarPart." In an alternative embodiment, pointer 108 is stored independently, or substantially independently, as a static class member in ROM 14, in which constant part 104 is also stored. In another alternative embodiment, for example, where object-oriented programming is not being utilized, pointer 108 is stored in a different ROM from constant part 104. In another alternative embodiment, for example, where object-oriented programming is not being utilized, pointer 108 is stored independently in ROM 14, in which constant part 104 is also stored. In another alternative embodiment, for example, where object-oriented programming is not being utilized, pointer 108 is stored in a different ROM 14 from constant part 104. In another alternative embodiment, where the object-oriented programming strictly follows object-oriented rules, pointer 108 is encapsulated in a class instance and cannot exist separately from constant part 104.

Figure 3:
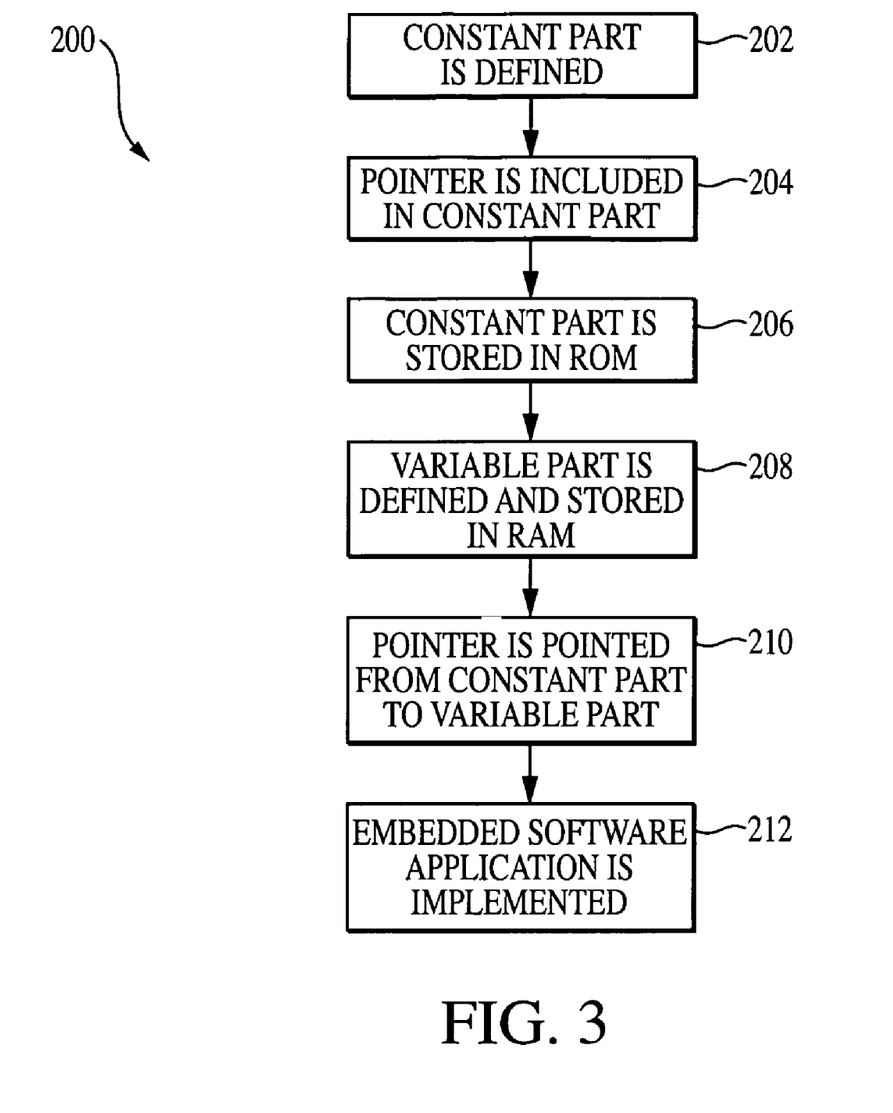
FIG. 3 is a flow chart illustrating a preferred method for implementing the embedded system using the aggregated data type design pattern according to the present invention.

FIG. 3 is a flow chart illustrating a preferred method for implementing the embedded system using aggregated data type design pattern 102. Aggregated data type design method 200 includes defining constant part 104 of the data type, step 202, and including pointer 108 in constant part 104, step 204. Next, constant part 104 is stored in ROM 14, step 206. Variable part 106 is then defined and stored in RAM 16, step 208. It should be noted that variable part 106 may be defined and stored in RAM 16 before constant part 104 and pointer 108 are defined and stored in ROM 14.

Next, pointer 108 is pointed from constant part 104, stored in ROM 14, to variable part 106, stored in RAM 16, step 210. Finally, the embedded software application is implemented, step 212. In alternative embodiments, the steps and specific sequence of steps described herein can be altered, exchanged, and/or modified in accordance with the present invention so long as the functionality described herein can be implemented.

As stated previously, C++ can be used to implement the design pattern for the embedded system. Below is an example of C++ code that can be used to implement aggregated data type design pattern 102 in one embodiment of the invention:

```
// CConstPart declaration
class CConstPart
{
public:
    // CVarPart declaration
    class CVarPart
    {
    // . . .
    };
public:
    CVarPart *m_pVarPart;
};
// A sample of usage
CConstPart::CVarPart VarObj;
const CConstPart ConstObj = {&VarObj};
```

In some implementations of an embedded system, an optional resource manager design pattern may be a more efficient way to handle objects of an aggregated type than aggregated data type design pattern 102. The resource manager design pattern may be a more efficient implementation if resources in the embedded application satisfy several conditions, for example: 1) the resources are to be represented by an aggregated, heterogeneous data type; 2) the resources have multiple instances; and/or 3) there is a polymorphic way to handle the resources. The resource manager design pattern can be widely used in drivers, for example, for analog/digital inputs/outputs, serial communication ports, hardware/software, timers, etc.

Figure 4:
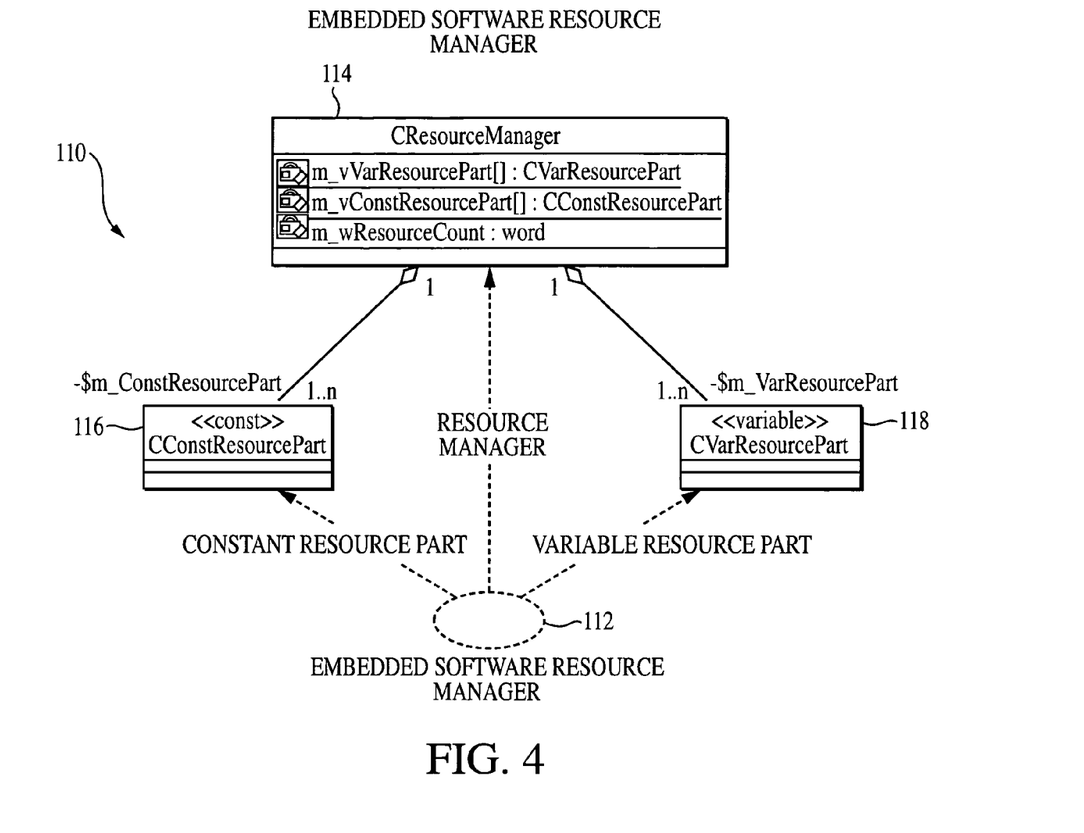
FIG. 4 is a Unified Modeling Language class diagram of an embedded software resource manager for implementing an embedded system according to the present invention.

FIG. 4 illustrates a UML class diagram 110 of embedded software resource manager 112. Embedded software resource manager 112 is implemented by resource manager class 114, called "CResourceManager" in this example. Resource manager class 114 preferably provides methods to access and/or control the resource objects. Resource manager class 114 consists of an array of constant parts 116, for example, "m_vConstResourcePart[ ]," and an array of variable parts 118, for example, "m_vVarResourcePart[ ]."

The array of constant parts 116 and the array of variable parts 118 are preferably associated many-to-many, such that one constant part 116 has a relation to one or many variable parts 118 and, at the same time, one variable part 118 has a relation to one or many constant parts 116. The multiplicity of the association depends on the access and control algorithm of embedded software resource manager 112.

Preferably, both arrays, m_vConstResourcePart[ ] and m_vVarResourcePart[ ], are the same size. The size of the arrays is determined by the number of resource objects, "m_wResourceCount" in this example. The argument "word" is a UML data type, representing two bytes. Another example of a possible UML data type is byte or double word, which corresponds to four bytes.

Constant parts 116 are represented by class "CConstResourcePart." There are 1 . . . n elements of array m_vConstResourcePart[ ], which correspond to the number of resource objects, denoted by m_wResourceCount. Likewise, variable part 118 are represented by class "CVarResourcePart," and there are 1 . . . n elements of array m_vVarResourcePart[ ], which also correspond to the number of resource objects. As stated previously, there are preferably the same number of constant parts 116 and variable parts 118. In order to improve the ROM-to-PAM ratio of an embedded system implemented using embedded software resource manager 112, the array of constant parts 116 is stored in ROM 14 and only the array of variable parts 118 is stored in RAM 16.

Embedded software resource manager 112, preferably uses arrays rather than pointers or other indexing methods to accomplish aggregation of constant parts 116 and variable parts 118. By containing both constant parts 116 and variable parts 116 in an array, resource manager class 114 can directly access and/or control the array of both classes.

Figure 5:
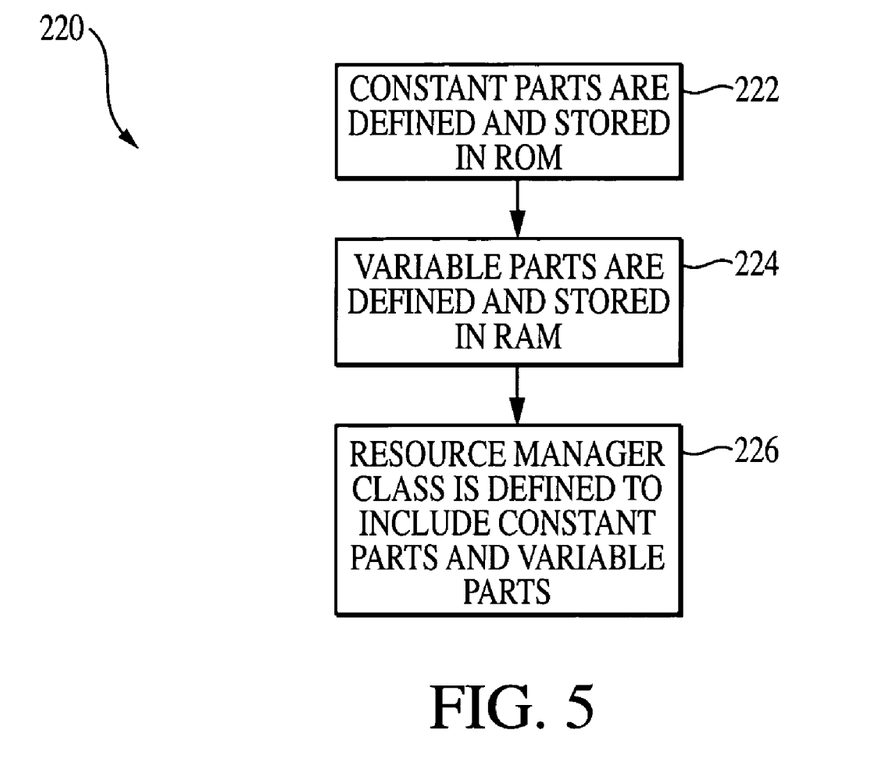
FIG. 5 is a flow chart illustrating a preferred method for implementing the embedded system using the embedded software resource manager according to the present invention.

FIG. 5 is a flow chart illustrating a preferred method for implementing the embedded system using embedded software resource manager 112. Embedded software resource manager method 220 includes defining the array of constant parts 116, step 222, and then defining the array of variable parts 118, step 224. The array of variable part 118 may be defined before the array of constant parts 116. Next, resource manager class 114 is defined to include the array of constant parts 116 and the array of variable parts 118, step 226. In alternative embodiments, the steps and specific sequence of steps described herein can be altered, exchanged, and/or modified in accordance with the present invention so long as the functionality described herein can be implemented.

Below is an example of C++ code that can be used to implement embedded software resource manager 112:

```
// VarResourcePart.h
class CVarResourcePart
{
    byte m_byVar;
public:
    void Set (byte a_byValue);
    void Run( ){ }
};
void CVarResourcePart::Set(byte a_byValue)
    {m_byVar = a_byValue;}
// ConstResourcePart.h
class CConstResourcePart
{
public:
    byte m_byConst;
};
inline void CVarResourcePart::Set(byte a_byValue)
    {m_byVar = a_byValue;}
// ResourceManager.h
#include "ConstResourcePart.h"
#include "VarResourcePart.h"
class CResourceManager
{
private:
    // Data Members for Class Attributes
    const static CConstResourcePart m_vConstResourcePart[ ];
    static CVarResourcePart m_vVarResourcePart[ ];
    const static word m_wResourceCount;
public:
    CResourceManager( );
    void Set(word a_wIndex);
};
// ResourceManager.cpp
#include "ResourceManager.h"
const CConstResourcePart
CResourceManager::m_vConstResourcePart[ ] = {1,2,3};
```

-continued

```
const word CResourceManager::m__wResourceCount =
sizeof(m__vConstResourcePart)/sizeof(CConstResourcePart);
CVarResourcePart
CResourceManager::m__vVarResourcePart[sizeof(m__vConstResource
Part)/sizeof(CConstResourcePart)];
CResourceManager::CResourceManager( )
{
    for (word wIndex = 0; wIndex < m__wResourceCount;
wIndex++)
        m__vVarResourcePart[wIndex].Set(m__vConstResourcePart[wIn
dex].m__byConst);
}
void CResourceManager:: Set(word a__wIndex)
{
    if (a__wIndex < m__wResourceCount)
        m__vVarResourcePart[a__wIndex].Set( );
}
```

Embedded systems also can be used in server-client systems in alternative embodiments. For example, an embedded software application using various architectures may, generally, need to implement an event-subscription mechanism, such as a timer, a message, and/or some other external event. In a server-client system embodiment, a server object notifies a client object about a change in the client object's states by firing an event. Typically, the client object is associated with a method that is to be executed if the event occurs. In order to notify the client object of the event, the server object needs to keep a subscription to the event.

Figure 6:
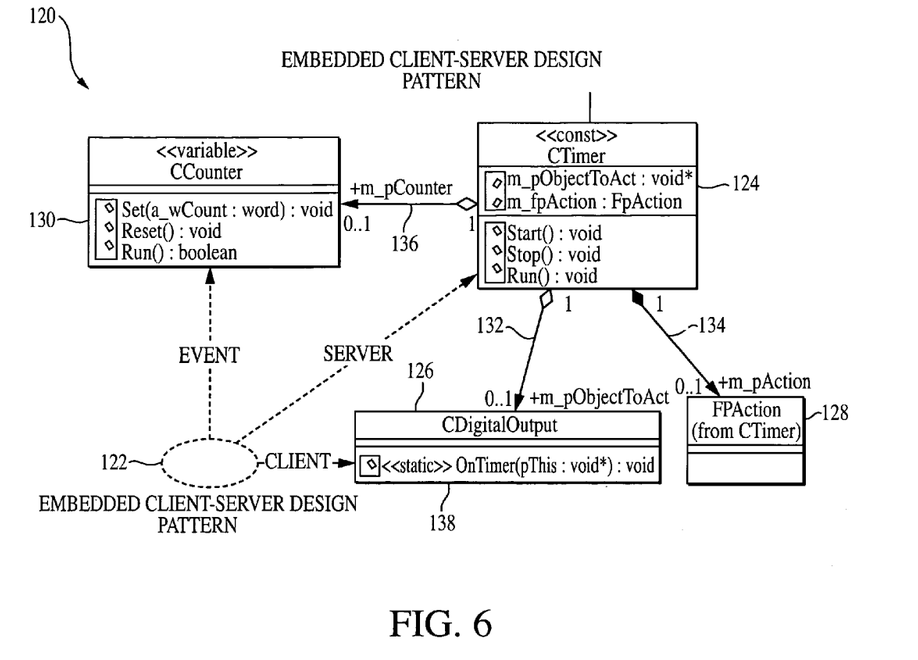
FIG. 6 is a Unified Modeling Language class diagram of an embedded client-server design pattern for implementing an embedded system according to the present invention.

FIG. 6 illustrates a UML class diagram 120 of an embedded client-server design pattern 122. Server class 124, "CTimer," is an example of an implementation of a server object. Client class 126, "CDigitalOutput," is an example of an implementation of a client object. The subscription to the even may be implemented using a pair of pointers. The pair of pointers is preferably defined as part of server class 124. First pointer 132 points from server class 124 to client class 126. Second pointer 134 points from server class 124 to the method of the client object to be executed in case of the event, for example, function 138, "OnTimer." In this example, "FPAction" 128 is a C++ type definition for pointer-to-function type and pointer 134 "m__fpAction" is an instance of this type, which points to the function 138 "OnTimer".

To provide a generic subscription mechanism, server class 124 keeps first pointer 132, called "m__pObjectToAct" in this example, pointed to void (pointer to client class 126) and second pointer 134, "m__fpAction," pointed, for example, to a C-style function (function 138), that takes second 134 pointer to void. Server class 124 notifies client class 126 by calling function 138 pointed by second pointer 134 and passing first pointer 132 as the argument.

In order to be able to receive events from server class 124, the class implementing client class 126 needs to support an event interface: for example, static inline void OnTimer (void *) function to be implemented. This means that client class 126 preferably has a static member function with the same signature as pointer-to-function type 128, "FPAction," in order to call this function from the server class 124 by the pointer 134. Being inline and non-virtual, the function advantageously does not bring any substantial overhead. Due to this lack of overhead and realization of the classes implementing server class 124 and client object 126 without using an abstract base class makes embedded client-server design pattern 122 very compact and suitable even to low end embedded applications.

Function 138 is the method associated with client class 126. Function 138 may represent the type of action taken by client class 126. For example, CDigitalOutput provides an implementation of action "OnTimer." OnTimer resets the value of the digital output, for example, to zero. CDigitalOutput can represent the digital output of any embedded system and typically has two states, for example, zero and one. The digital output could be set to one, representing, for example, the start of a microwave timer. To automatically shut off the microwave when the timer expires, the digital output is reset to zero by OnTimer when the microwave timer expires. The automotive industry provides another example. CDigitalOutput can be set to one when the interior light of a car turns on and, after a certain amount of time has expired, is turned off by OnTimer setting CDigitalOutput back to zero.

In this example, CTimer has two constant fields, first pointer 132 and second pointer 134, which are constant throughout the lifetime of CTimer. These constant fields, as well as server class 124, are stored in ROM 14. CTimer also has variable attribute class 130, "CCounter," which is a field for the timer, in this example. CCounter allows the timer to increment or decrement and is store in RAM 16 since the value of CCounter changes. Client class 126 may be stored in either ROM 14 or RAM 16. In this embodiment, pointer-to-function type 128 has no instance except as a member of second pointer 134 and is thus allocated in ROM 14. Alternative configurations, where pointer-to-function type 128 has other or additional instances is possible.

Figure 7:
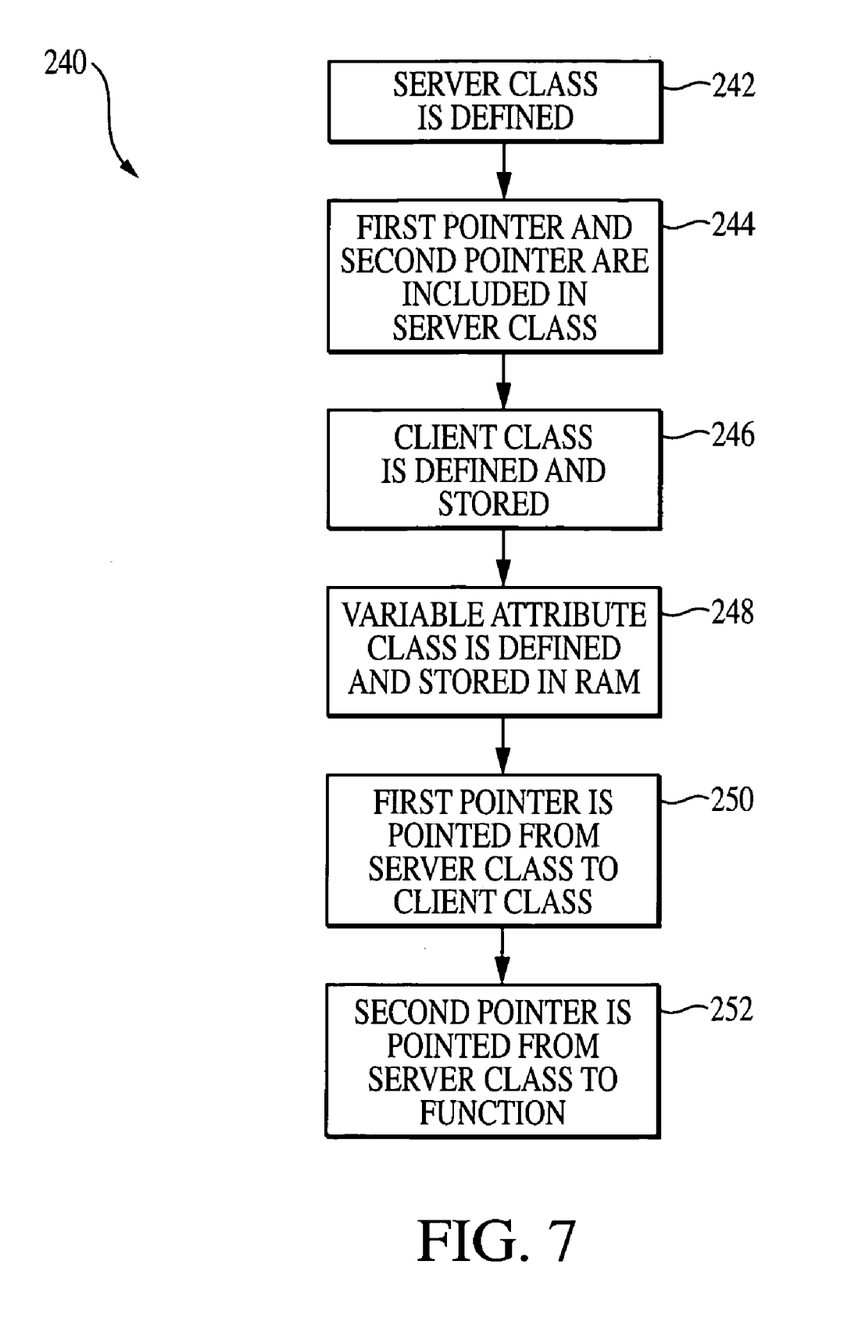
FIG. 7 is a flow chart illustrating a preferred method for implementing the embedded system using the embedded client-server design pattern according to the present invention.

FIG. 7 is a flow chart illustrating a preferred method for implementing the embedded system using embedded client-server design pattern 122. Embedded client-server design method 240 includes defining server class 124, step 242. First pointer 132 and second pointer 134 are included in server class 124, step 244. Next client class 126 is defined and stored, step 246. Client class 126 may be stored in either ROM 14 or RAM 16. Variable attribute class 130 is then defined and stored in RAM 16, step 248. It should be noted that there is no significance to the order in which server class 124, client class 126, and variable attribute class 130 are defined and stored. First pointer 132 is then pointed from server class 124 to client class 126, step 250. Second pointer 134 is then pointed from server class 124 to function 138, step 252. Again, it is of no significance in which order first pointer 132 and second pointer 134 are pointed to their respective destinations.

Below is an example of C++ code that can be used to implement embedded client-server design pattern 122:

```
// counter.h
#include "types.h"
// declaration and implementation of the CCounter class
class CCounter
{
    word m__wCount; // time count
public:
    void Set(word a__wCount);
    void Reset( );
    boolean Run( );
};
// reset counter
inline void CCounter::Reset( )
{
    m__wCount = 0;
}
// set counter
inline void CCounter::Set(word a__wCount)
{
```

-continued

```
    m__wCount = a__wCount;
}
// run counter
inline boolean CCounter::Run( )
{
    // decrement counter
    if (m__wCount > 0)
    {
        m__wCount--;
        return (m__wCount == 0);
    }
    return FALSE;
}
// dout.h
// the digital output class
class CDigitalOutput
{
public:
    byte* m__pbyPort;
    void Set( ){*m__pbyPort = 1;}
    void Reset( ){*m__pbyPort = 0;}
    static void OnTimer(void *pThis);
};
inline void CDigitalOutput::OnTimer(void *pThis)
{
    ((CDigitalOutput*)pThis)->Reset( );
}
// timer.h
#include "types.h"
class CCounter;
// declaration of the CTimer class
class CTimer
{
public:
    // timer action type declaration
    typedef void (*FPTimerAction) (void *);
    // attributes
    word m__wTimeout;          // timeout constant
    CCounter* m__pCounter;     // time counter
    void* mpObjectToAct;       // pointer to an object
to act on the event
    FPTimerAction m__fpAction;// pointer to the object's
method to call on the event
    // methods
    void Start( ) const;
    void Stop( ) const;
    void Run( ) const;
};
// start timer
inline void CTimer::Start( ) const
{
    m__pCounter->Set (m__wTimeout);
}
// stop timer
inline void CTimer::Stop( ) const
{
    m__pCounter->Reset( );
}
// timer.cpp
#include "counter.h"
#include "timer.h"
// implementation of the CTimer class
// run timer
void CTimer::Run( ) const
{
    // run counter till an event
    if (m__pCounter->Run( ))
    {
        // perform an action on the event
        m__fpAction(m__pObjectToAct);
    }
}
// main .cpp
// A sample how to use the CTimer class
#include "counter.h"
#include "timer.h"
#include "dout.h"
// a sample how to use the CTimer class
// construct the objects
```

-continued

```
    CDigitalOutput DOut = {(byte*)0xff80U}; // the object to
call on timer event
    static CCounter Counter;        // variable attribute of
the timer
    const CTimer DOutTimer =
    {
        3,                          // timeout constant
        &Counter,                   // time counter
        (void *)&DOut,              // pointer to an object
to act on event
        (CTimer::FPTimerAction)CDigitalOutput::OnTimer
                                    // pointer to the object's
method
    };
    // the following code turns output on for time specified by
the timeout constant
    void main(void)
    {
        DOut.Set( );                // set the digital output on
        DOutTimer.Start( );         // start the timer
        for(;;)
        {
            DOutTimer.Run( ); // reset the output after timeout
        }
    }
```

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

What is claimed is:

1. A system implementing an embedded software application having at least one data type implemented by the system that includes at least one substantially constant part and at least one substantially variable part, the system comprising:
   a first computer memory in data communication with a processing unit that stores the at least one substantially constant part of the at least one data type;
   a second computer memory in data communication with a processing unit that stores the at least one substantially variable part of the at least one data type; and
   a linking object stored in at least one of the first memory and a third computer memory in data communication with a processing unit that actively links the first memory and the second memory, wherein the linking object provides that the at least one substantially constant part and the at least one substantially variable part are aggregated into the at least one data type.

2. The system of claim 1, wherein the first memory comprises a read-only memory.

3. The system of claim 2, wherein the linking object comprises a pointer, the pointer being stored independently in the read-only memory.

4. The system of claim 1, wherein the second memory comprises a random-access memory.

5. The system of claim 1, wherein the linking object comprises a pointer and the third memory stores the pointer.

6. The system of claim 5, wherein the third memory comprises a read-only memory.

7. The system of claim 1, wherein the linking object comprises a pointer, the pointer being included in the at least one substantially constant part.

8. The system of claim 7, wherein the embedded software application is implemented using an object-oriented design, such that the at least one substantially constant part comprises an object and the at least one substantially variable part comprises at least one variable attribute of the object, the pointer pointing from the object to the variable attribute.

9. The system of claim 8, wherein the object is implemented as a class instance and the pointer is included in the object as a class attribute.

10. The system of claim 9, wherein the embedded software application strictly follows object-oriented rules and the pointer is encapsulated in a class instance and does not exist separately from the object.

11. The system of claim 8, wherein the at least one variable attribute of the object is imiplemented as a class instance.

12. The system of claim 8, wherein the first memory comprises a read-only memory.

13. The system of claim 8, wherein the second memory comprises a random-access memory.

14. The system of claim 1, wherein the linking object comprises an array.

15. The system of claim 14:
wherein resource objects comprise constant attributes and variable attributes;
wherein the at least one substantially constant part comprises a first number of the constant attributes of the resource objects; and
wherein the at least one substantially variable part comprises a second number of the variable attributes of the resource objects, the array comprising a set of the first number of the constant attributes and the second number of the variable attributes.

16. The system of claim 15, wherein the array is implemented using a class that provides method for accessing and controlling the constant attributes of the resource objects and the variable attributes of the resource objects.

17. The system of claim 15, wherein the first number of the constant attributes of the resource objects is the same as the second number of the variable attributes of the resource objects.

18. The system of claim 1, wherein the linking object comprises a first pointer and a second pointer, the first pointer and the second pointer being included in the at least one substantially constant part.

19. The system of claim 18:
wherein the embedded software application implements an event subscription mechanism for a server object and a client object, the client object having a function;
wherein the at least one substantially constant part comprises the server object and the at least one substantially variable part comprises at least one variable attribute of the server object; and
wherein the first pointer points from the server object to the client object and the second pointer points from the server object to the function of the client object.

20. The system of claim 19, wherein the server object is implemented as a class and the first pointer and the second pointer are included in the server object as a class attribute.

21. The system of claim 19, wherein the client object is implemented as a class instance.

22. The system of claim 19, wherein the at least one variable attribute of the server object is implemented as a class instance.

23. The system of claim 1, wherein the system reduces a ratio of storage between computer read-only memory and computer random-access memory for the embedded software application.

24. The system of claim 1, wherein the system reduces computer random-access memory storage for the embedded software application.

25. The system of claim 1, where the system decreases a start up time of the embedded software application by eliminating or reducing a need for transfer of data from computer read-only memory to computer random-access memory.

26. A system implementing an embedded software application that realizes an object oriented design having at least one data type that includes at least one constant attribute and at least one variable attribute, the at least one data type being instantiated as at least one object that comprises the at least one constant attribute, the object oriented design being implemented by the system, the system comprising:
a first computer memory in data communication with a processing unit that stares the at least one constant attribute, wherein the at least one constant attribute is implemented as a class instance;
a second computer memory in data communication with a processing unit that stores the at least one variable attribute, wherein the at least one variable attribute is implemented as a class instance; and
a pointer stored in at least one of the first memory and a third computer memory in data communication with a processing unit, implemented as a class member of the at least one constant attribute, that points from the first memory to the second memory, wherein the pointer provides at least one of the system and the constant attribute at least one of access and control of the at least one variable attribute.

27. A system implementing an embedded software application that realizes an object oriented design having multiple instances of a data type that includes a first number of constant attributes of resource objects and a second number of variable attributes of the resource objects, the object oriented design being implemented by the system, the system comprising:
a first computer memory in data communication with a processing unit that stores the first number of constant attributes of the resource objects;
a second computer memory in data communication with a processing unit that stores the second number of variable attributes of the resource objects; and
a resource manager class that comprises an array that comprises the first number of constant attributes of the resource objects and the second number of variable attributes of the resource objects, wherein the resource manager class provides method to access and control the constant attributes of the resource objects and the variable attributes of the resource objects.

28. The system of claim 27, wherein the first number of the constant attributes of the resource objects is the same as the second number of the variable attributes of there source objects.

29. The system of claim 27, wherein the first number of the constant attributes and the second number of the variable attributes are associated many-to-many, such that the first number of the constant attributes and the second number of the variable attributes comprise a third number of the resource objects.

30. A system implementing an embedded software application that realizes an object oriented design, the embedded software application implementing an event subscription mechanism for a server object and a client object, which has a function, the system comprising:
- a first computer memory in data communication with a processing unit that stores the server object, wherein the server object is implemented as a class;
- a second computer memory in data communication with a processing unit that stores at least one variable attribute of the server object, wherein the at least one variable attribute is implemented as a class;
- a first pointer, implemented as a class attribute of the server object, that points from the server object to the client object; and
- a second pointer, implemented as a class attribute of the server object, that points from the server object to the function of the client object, wherein at least one of the first pointer and the second pointer provides the system at least one of access and control of at least one of the client object and the function of the client object.

31. A system implementing an embedded software application having at least one data type implemented by the system that includes at least one substantially constant part and at least one substantially variable part, the system comprising:
- first computer storage means in data communication with a processing unit for storing the at least one substantially constant part of the at least one data type;
- second computer storage means in data communication with a processing unit for storing the at least one substantially variable part of the at least one data type; and
- linking means stored in at least one of the first computer storage means and a third computer storage means in data communication with a processing unit, wherein the linking means provides method for actively linking the first storage means and the second storage means such that the at least one substantially constant part and the at least one substantially variable part are aggregated into the at least one data type.

32. A system implementing an embedded software application having at least one data type implemented by the system that includes at least one substantially constant part and at least one substantially variable part, the system comprising:
- a microprocessor;
- a first computer memory in data communication with the microprocessor that stores the at least one substantially constant part of the at least one data type;
- a second computer memory in data communication with the microprocessor that stores the at least one substantially variable part of the at least one data type; and
- a linking object that enables aggregation of the at least one substantially constant part, stored in the first memory, and the at least one substantially variable part, stored in the second memory, into the at least one data type to provide the system at least one of access and control of the at least one data type.

33. A computer implemented method for implementing an embedded software application having at least one data type that includes at least one substantially constant part and at least one substantially variable part, the method comprising:
- storing the at least one substantially constant part in a first computer memory;
- storing the at least one substantially variable part in a second computer memory;
- defining a linking object between the at least one substantially constant part and the at least one substantially variable part such that the at least one substantially constant part and the at least one substantially variable part are aggregated into the at least one data type; and
- implementing the embedded software application by implementing the at least lone substantially constant part, stored in the first memory, and implementing the at least one variable part, stored in the second memory, by implementing the linking object.

34. The method of claim 33, wherein storing the at least one substantially constant part further comprises storing the at least one substantially constant part in the first memory comprising a read-only memory.

35. The method of claim 33, wherein storing the at least one substantially variably part further comprises storing the at least one substantially variable part in the second memory comprising a random-access memory.

36. The method of claim 33, wherein defining the linking object further comprises defining a pointer, the pointer being included in the at least one substantially constant part.

37. The method of claim 33, wherein the embedded software application is implemented using an object-oriented design, such that the at least one substantially constant data part comprises an object and the at least one substantially variable part comprises at least one variable attribute of the object, the pointer pointing from the object to the variable attribute.

38. The method of claim 37, wherein the object is implemented as a class instance and the pointer is included in the object as a class attribute.

39. The method of claim 37, wherein the at least one variable attribute is implemented as a class instance.

40. The method of claim 37, wherein storing the at least one substantially constant part further comprises storing the at least one substantially constant part in the first memory comprising a read-only memory.

41. The method of claim 37, wherein storing the at least one substantially variably part further comprises storing the at least one substantially variable part in the second memory comprising a random-access memory.

42. The memory of claim 33, wherein defining the linking object further comprises defining an array.

43. The method of claim 42, wherein defining the array further comprises defining a first number of constant attributes of resource objects, the at least one substantially constant part comprising the first number of the constant attributes of the resource objects, and defining a second number of variable attributes of the resource objects, the at least one substantially variable part comprising the second number of the variable attributes of the resource objects, such that the array comprises a set of the first number of the constant attributes and the second number of the variable attributes.

44. The method of claim 43, wherein the array is implemented using a class that provides methods for accessing and controlling the first number of the constant attributes of the resource objects and the second number of the variable attributes of the resource objects.

45. The method of claim 43, wherein the first number of the constant attributes of the resource objects is the same as the second number of the variable attributes of the resource objects.

46. The method of claim 33, wherein defining the linking object further comprises defining a first pointer and a second pointer, the first pointer and the second pointer being included in the at least one substantially constant part.

47. The method of claim 46:
wherein the embedded software application implements an event subscription mechanism for a server object and a client object, the client object having a function;
wherein storing the at least one substantially constant part further comprises storing the server object;
wherein storing the at least one substantially variable part further comprises storing at least one variable attribute of the server object; and
wherein the first pointer points from the server object to the client object and the second pointer points from the server object to the function of the client object.

48. The method of claim 47, wherein the server object is implemented as a class and the first pointer and the second pointer are implemented as class attributes of the server object.

49. The method of claim 47, wherein the client object is implemented as a class instance.

50. The method of claim 47, wherein the at least one variable attribute of the server object is implemented as a class instance.

* * * * *